June 10, 1947.                V. CRONSTEDT                2,421,832
                        BALANCING A TURBINE ROTOR
                         Filed July 23, 1943            2 Sheets-Sheet 2

Patented June 10, 1947

2,421,832

UNITED STATES PATENT OFFICE 2,421,832

BALANCING A TURBINE ROTOR

Val Cronstedt, Marlboro, Conn., assignor to United Aircraft Corporation, East Hartford, Conn., a corporation of Delaware Application July 23, 1943, Serial No. 495,934

6 Claims. (Cl. 253—69)

Turbine rotors, which generally run at high speed, must be accurately in static and dynamic balance to avoid vibration. When the turbine is designed for a stationary installation, where weight limitations are not imposed, the rotor is usually made heavy enough so that the removal of material from the rotor in balancing does not seriously reduce the strength of the rotor.

Where weight limitations are imposed, however, as when the turbine is designed for use in aircraft, the parts are all made as light as possible and consequently highly stressed. In this case, removal of material for balancing the rotor may result in over-stressing parts of the rotor with possible failure. A feature of this invention is the provision of extra material on the rotor, so located that it does not partake in the stress-carrying rotor structure and may be removed for balancing without affecting the rotor strength.

Another feature of this invention is the formation of two or more balancing rings on the rotor, preferably near its periphery and ends so that all, or a part, of the rings may be removed for statically and dynamically balancing the rotor without affecting the strength of the rotor.

Other objects and advantages will be apparent from the specification and claims and from the accompanying drawings which illustrate an embodiment of the invention.

Figure 1:
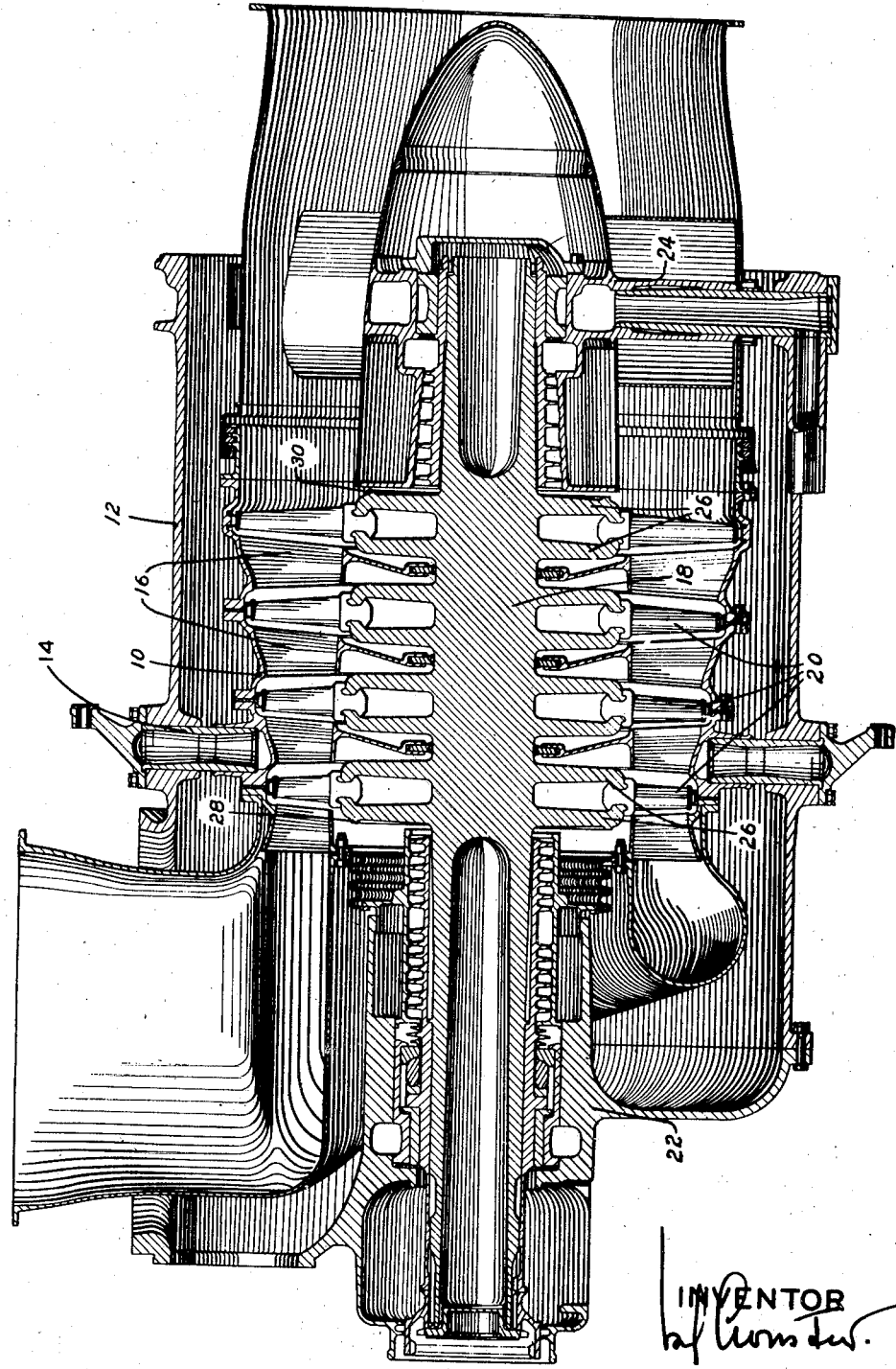
Fig. 1 is a sectional view through the turbine.

The turbine includes a casing 10 supported in a housing 12 by radially extending pins 14. These pins extend through bores in the housing and engage aligned bores in the casing. These pins are all in substantially the same plane and support the casing so that it is free to expand radially or axially.

Within the casing, which may have several rows of nozzle-forming vanes 16, is the turbine rotor 18 having rows of blades 20 alternating with the rows of nozzles. The rotor is supported at one end by the head 22 which forms a part of the housing and at the other end by a spider 24 also supported by the housing.

Figure 2:
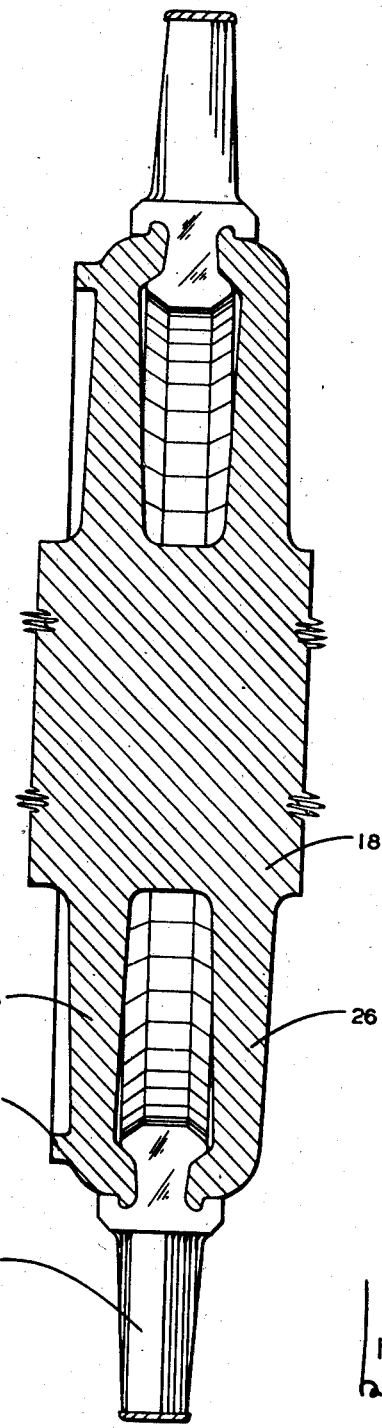
Fig. 2 is a sectional view of a part of a rotor on a larger scale showing one end row of blades with the balancing rib on the rotor.

The rotor has a number of pairs of discs 26, each pair supporting one row of blades 20. Each disc 26 is essentially a constant-stress disc and, as shown in Fig. 2, the outer ends of each pair of discs are formed to support between them the roots of the blades.

For statically and dynamically balancing the rotor after the blades have been mounted, balancing ribs 28 and 30 are formed on the outer sides of the end discs of the rotor and adjacent to the periphery of the discs. These ribs, which project laterally from constant-stress discs, provide extra material conveniently located for removal in balancing the rotor. The ribs are thin and thus do not cause a stress concentration where they project from the disc. The removal of all, or a part, of both of these ribs for balancing the rotor does not affect the strength of the discs, as the ribs do not form a part of the load-carrying structure.

It is to be understood that the invention is not limited to the specific embodiment herein illustrated and described, but may be used in other ways without departure from its spirit as defined by the following claims.

I claim:

1. A turbine rotor for an axial flow turbine, said rotor having a number of axially spaced discs integral with and extending radially from a one-piece hub, said discs supporting a number of axially spaced rows of turbine blades, the blades in each row being secured to the discs at their inner ends and extending radially outward therefrom, and a projecting annular rib on the outer side only of each end disc, each rib being located adjacent to the outer radial periphery of the disc, said ribs being integral with the discs and extending beyond the part of the disc essential for carrying the centrifugal loads resulting from rotation of the rotor, the mass of material of the ribs being insufficient to impart substantial bending stresses to the discs or blades during rotation.

2. A turbine rotor for an axial flow turbine, said rotor having a number of axially spaced discs integral with and extending radially from a one-piece hub, said discs supporting a number of axially spaced rows of turbine blades, the blades in each row being secured to the discs at their inner ends and extending radially outward therefrom, and a projecting annular rib on the outer side only of each end disc, each rib being located adjacent to the outer radial periphery of the disc, said ribs providing material by the removal of at least a part of which the rotor may be balanced, said ribs being integral with the discs and extending beyond the part of the disc essential for carrying the centrifugal loads resulting from rotation of the rotor, each of said ribs having substantially a uniform cross-sectional area whereby balancing of the rotor may be accomplished by removal of material at any point thereof.

3. A turbine rotor for an axial flow turbine, said rotor having a number of axially spaced discs and a number of axially spaced rows of turbine blades carried by said discs, the blades in each row of blades being secured to the discs at their inner ends and extending radially outward therefrom, and at least two projecting annular ribs carried by said discs in axially spaced relation to each other, each of said ribs being integral with one of the discs and being located adjacent to the outer radial periphery of the disc, each of said ribs extending beyond the part of the disc essential for carrying the centrifugal loads resulting from rotation of the rotor, the mass of the material of the ribs being insufficient to impart substantial bending stresses to the discs or blades during rotation, said ribs providing material by the removal of at least a part of which the rotor may be balanced, each rib having a substantially uniform cross-sectional area whereby balancing of the rotor may be accomplished by removal of material at any point thereof.

4. A turbine rotor for an axial flow turbine, said rotor having a number of axially spaced discs integral with and extending radially from a one-piece hub, said discs supporting a number of axially spaced rows of turbine blades, the blades in each row being secured at their inner ends to the discs and extending radially outward therefrom substantially in a radial plane, and a projecting annular rib on the outer side of at least one end disc, said rib being located adjacent to the outer radial periphery of the disc and being integral with the disc, said rib providing material by the removal of a part of which the rotor may be balanced, said rib extending beyond the part of the disc essential for carrying the centrifugal loads resulting from rotation of the rotor and said rib having a substantially uniform cross-sectional area whereby balancing the rotor may be accomplished by removal of material at any point thereof.

5. A turbine rotor for an axial flow turbine, said rotor having at least one constant-stress disc, at least one row of turbine blades attached to the disc, said blades being attached at their inner ends to the disc and extending outwardly therefrom substantially in a radial plane, and a projecting annular rib on at least one side of said disc, said rib being located adjacent to the outer radial periphery of the disc and having a substantially uniform cross-sectional area, said rib being out of contact with any other part of the rotor and extending beyond the part of the disc essential for carrying the centrifugal loads resulting from rotation of the rotor, the mass of the material of the rib being insufficient to impart a substantial bending stress to the disc or blades during rotation.

6. A turbine rotor for an axial flow turbine, said rotor having a number of axially spaced rows of turbine blades, the blades in each row being attached at their inner ends to the rotor and extending outwardly therefrom substantially in a radial plane, and a projecting annular rib on the rotor at the outer side of each end row of blades, said ribs being axially spaced from each other, each rib being located adjacent to the attachment of the outer row of blades to the rotor and being integral with the rotor and each rib being out of contact with any other part of the rotor, each rib providing material by the removal of which the rotor may be balanced and each rib extending beyond the part of the rotor essential for carrying the centrifugal loads resulting from the rotation of the rotor, the mass of the material of the ribs being insufficient to impart substantial bending stresses to the blades during rotation, and each rib having a substantial uniform cross-sectional area whereby balancing of the rotor may be accomplished by removal of material at any point thereof.

VAL CRONSTEDT.

REFERENCES CITED

The following references are of record in the file of this patent:

UNITED STATES PATENTS

| Number | Name | Date |
|---|---|---|
| 1,320,031 | Andrews | Oct. 28, 1919 |
| 1,470,607 | Hazell | Oct. 16, 1923 |
| 1,906,697 | Lysholm | May 2, 1933 |